(12) United States Patent
Lal et al.

(10) Patent No.: US 8,229,625 B2
(45) Date of Patent: Jul. 24, 2012

(54) METHOD AND APPARATUS FOR CUSTOMIZING A WIRELESS NETWORK ARCHITECTURE

(75) Inventors: Dhananjay Lal, Pittsburgh, PA (US); Soundararajan Srinivasan, Munhall, PA (US); Aca Gacic, Pittsburgh, PA (US); Thomas Hogenmueller, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 894 days.

(21) Appl. No.: 12/245,240

(22) Filed: Oct. 3, 2008

(65) Prior Publication Data

US 2010/0087986 A1    Apr. 8, 2010

(51) Int. Cl.
*G06F 7/00*    (2006.01)
(52) U.S. Cl. .......................................... 701/36
(58) Field of Classification Search ...................... 701/36
See application file for complete search history.

(56) References Cited

U.S. PATENT DOCUMENTS

| | | | |
|---|---|---|---|
| 6,078,252 A | 6/2000 | Kulczycki et al. | |
| 6,177,867 B1 | 1/2001 | Simon et al. | |
| 6,195,602 B1 * | 2/2001 | Hazama et al. | 701/48 |
| 6,480,144 B1 | 11/2002 | Miller et al. | |
| 7,005,972 B2 | 2/2006 | Matsumoto | |
| 7,084,748 B2 | 8/2006 | Schwab | |
| 7,099,751 B2 | 8/2006 | DePrez et al. | |
| 7,177,743 B2 * | 2/2007 | Roy | 701/36 |
| 7,603,214 B2 * | 10/2009 | Tanaka et al. | 701/36 |
| 7,689,327 B2 * | 3/2010 | Loda | 701/3 |
| 2003/0186652 A1 | 10/2003 | Hopf et al. | |
| 2005/0090953 A1 * | 4/2005 | Wolf et al. | 701/36 |
| 2005/0273211 A1 | 12/2005 | McGarry et al. | |
| 2008/0039998 A1 * | 2/2008 | Fein et al. | 701/36 |

FOREIGN PATENT DOCUMENTS

GB    2400221 A    6/2004

* cited by examiner

*Primary Examiner* — Eric Culbreth

(74) *Attorney, Agent, or Firm* — Taft Stettinius & Hollister, LLP

(57) ABSTRACT

A wireless network arrangement for a vehicle includes an electronic controller disposed within the vehicle. A plurality of wireless electronic components are disposed within the vehicle and are wirelessly communicatively coupled to the electronic controller. The components are networked together wirelessly such that members of any subgroup of the components can wirelessly communicate with each other.

20 Claims, 4 Drawing Sheets

METHOD AND APPARATUS FOR CUSTOMIZING A WIRELESS NETWORK ARCHITECTURE

BACKGROUND OF THE INVENTION

1. Field of the Invention

The present invention relates to networking systems, and, more particularly, to wireless networking systems.

2. Description of the Related Art

A modern car has complex functionality and a network architecture that supports numerous functions. It has been projected that the electronics inside a car will increase from about twenty-five percent of the car's total cost currently to about forty percent of the car's total cost in the foreseeable future. The increase of electronics in a car will place demands of better and more sophisticated network structures. The degree of networked infrastructure in a car as well as the sophistication of the network is specific to the car manufacturer, make and model. While generalizations about the networking infrastructure of a car do not hold true, a high-end car usually has more than one wired network. Typically, a high-end car has a high bandwidth network for power-train, and a relatively lower bandwidth network for body control and comfort features at a minimum. Lower-end cars tend to have fewer networked features. Costs associated with networking a car are the costs of development and testing of a network architecture, layout and planning. Due to the high degree of reliability expected from automobiles and the associated design cost, manufacturers are extremely prudent in adding new features or altering the existing network architecture.

Vehicles are known to be provided with steering wheel pushbuttons which may be wired to selected components of the automobile, for example, to a body controller area network (CAN) and to a gearbox. This wiring may enable the user to control radio functions and comfort functions manually from the steering wheel. Additionally, some functions inherently require communications with multiple control units and subnetworks. For example, a direct gear shift change control pushbutton may communicate with a gearbox electronic control unit (ECU), body control module, motor ECU, damping ECU, and steering column control unit.

The known wired architectures are very constraining in the variety of functional controls that can be provided. Further, the automotive manufacturers make decisions regarding what functions to provide to the driver at the steering wheel. While lower-end cars have a very limited networked architecture, higher-end cars may have up to three CAN networks with numerous sub networks like LIN (Local Interconnect Network). The rigidity of the known network architecture and the architecture's associated lack of flexibility therefore allow only limited functions to be controlled from the steering wheel.

In recent years, wireless networks have received much attention in research and development from industry and academia. While the cost of radio frequency integrated circuits has been on the decline, the technology itself has attained a level of maturity. Currently, it is possible to build much lower cost wireless nodes that may be embedded in any environment, which was not possible just a few years ago. Such wireless networks are therefore candidates for inclusion in future cars. One of the main advantages that in-vehicle wireless networks offer over their wired counterparts is the ease and flexibility with which they can be deployed. Due to the absence of wire placement requirements, wireless networks and wireless devices can also be made to reach inaccessible areas, or components inside rotating parts or chambers. In the absence of wires and connectors for wires, enhanced reliability can be achieved, particularly in applications where wiring is drawn to parts that undergo mechanical movement. Further, these wireless networks may also be easier to repair.

As is currently known, certain aspects of car functionality such as remote keyless entry, tire pressure monitoring, remote starting and immobilizing, etc. may depend on wireless technology. However, these wireless applications may be considered unreliable in the sense that their current implementations offer no reliability guarantees. Further, the wireless applications are not networked, but rather are isolated from other systems. Having no requirement for wiring, in-vehicle wireless networks have a much greater potential to serve a variety of functions.

What is neither disclosed nor suggested by the prior art is an arrangement for a wireless network in which wireless nodes may be attached to moving parts of a vehicle or other machine.

SUMMARY OF THE INVENTION

The present invention may also provide a wireless architecture including a plurality of different isolated wired structures that are networked together wirelessly. A single central Electronic Control Unit with a radio interface can communicate with any isolated network, and any pair or group of isolated networks can also communicate mutually with each other over wireless links. Each wireless node performs radio transmission and reception and has a small microcontroller that acts as a gateway for protocol translation between the wired and wireless domains. In a specific embodiment, the wireless architecture is used to program the functionality of steering wheel control pushbuttons as desired by the user. The present invention may provide a set of steering wheel pushbuttons that communicate wirelessly with a controller such that the functions of each of the pushbuttons are reconfigurable by the user.

The present invention may also provide an architecture for a wireless network inside a car. The invention may establish new features for comfort, convenience and safety inside the car by providing a highly connected network architecture wherein the different independent subnetworks can be operated interdependently using wireless links (with suitable gateways for protocol translation). The invention may provide a method of configuring pushbuttons on a steering wheel to perform an arbitrary set of comfort and control functions according to user preferences.

Numerous sensors and actuators may be wirelessly networked for communicating with each other and may collectively deliver rich features and performance. For example, numerous temperature sensors may be deployed and wirelessly networked in the vehicle cabin to optimize climate control. Similarly, a button on the steering wheel may contact and command any body control feature in the car that is wirelessly networked.

The invention comprises, in one form thereof, a wireless network arrangement for a vehicle. The arrangement includes an electronic controller disposed within the vehicle. A plurality of wireless electronic components are disposed within the vehicle and are wirelessly communicatively coupled to the electronic controller. The components are networked together wirelessly such that members of any subgroup of the components can wirelessly communicate with each other. At least one of the electronic components may be attached to the at least one movable part of the vehicle. The movable part may comprise a steering wheel. The wireless electronic components may include at least one pushbutton attached to the steering wheel. A display connected to the controller may be configured to provide feedback to a user during programming of the at least one pushbutton by the user. The at least one pushbutton may comprise a plurality of pushbuttons. The display may be configured to display mappings between the pushbuttons and the programmed functions of the pushbuttons.

The invention comprises, in another form thereof, a network arrangement for a vehicle. The arrangement includes a steering wheel disposed within the vehicle. A plurality of electronic pushbuttons are attached to the steering wheel. An electronic controller is disposed within the vehicle and is wirelessly communicatively coupled to the electronic pushbuttons. The controller receives a plurality of signals from the pushbuttons. The signals result from manual actuation of the pushbuttons in a coded sequence. The controller programs a function of at least one of the pushbuttons based on the received signals. Each of the pushbuttons may include a respective microcontroller configured to function as a wireless gateway.

The invention comprises, in yet another form thereof, an automotive networking method including providing a steering wheel disposed within a vehicle. A plurality of electronic pushbuttons are attached to the steering wheel. An electronic controller is provided within the vehicle. The electronic controller is wirelessly communicatively coupled to the electronic pushbuttons. The pushbuttons are manually actuated according to a code corresponding to a desired functionality of at least one of the pushbuttons. Signals are wirelessly transmitted from the pushbuttons to the controller. The signals are dependent upon the manual actuation of the pushbuttons. A function of at least one of the pushbuttons is programmed based on the transmitted signals.

An advantage of the present invention is that a wireless network may operate in a reliable fashion despite the presence of obstructions within an operating environment, such as an automotive passenger compartment.

Another advantage of the wireless network arrangement of the present invention is the ease and flexibility with which it can be deployed. Because there are no wires to create placement constraints on the wireless nodes, the wireless nodes can be installed in inaccessible areas, or inside rotating parts or chambers.

Yet another advantage of the wireless network arrangement of the present invention is that, in the absence of wires and connectors for wires, enhanced reliability can be achieved. Reliability may be particularly improved over applications where wiring is drawn to parts that experience mechanical movement.

Still another advantage of the present invention is that a wireless network is easier to repair than is a wired network.

A further advantage of the present invention is that the wireless nodes are networked together, rather than being isolated from other systems.

A still further advantage of the present invention is that the in-vehicle wireless network arrangement may perform a much greater variety of functions because there are no requirements for wiring. Numerous sensors and actuators may be wirelessly networked to communicate with each other and collectively deliver rich features and performance. For example, numerous temperature sensors may be deployed and wirelessly networked in the vehicle cabin to optimize climate control. Similarly, a button may be provided on the steering wheel to contact and command any body control feature in the car that is wirelessly networked.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
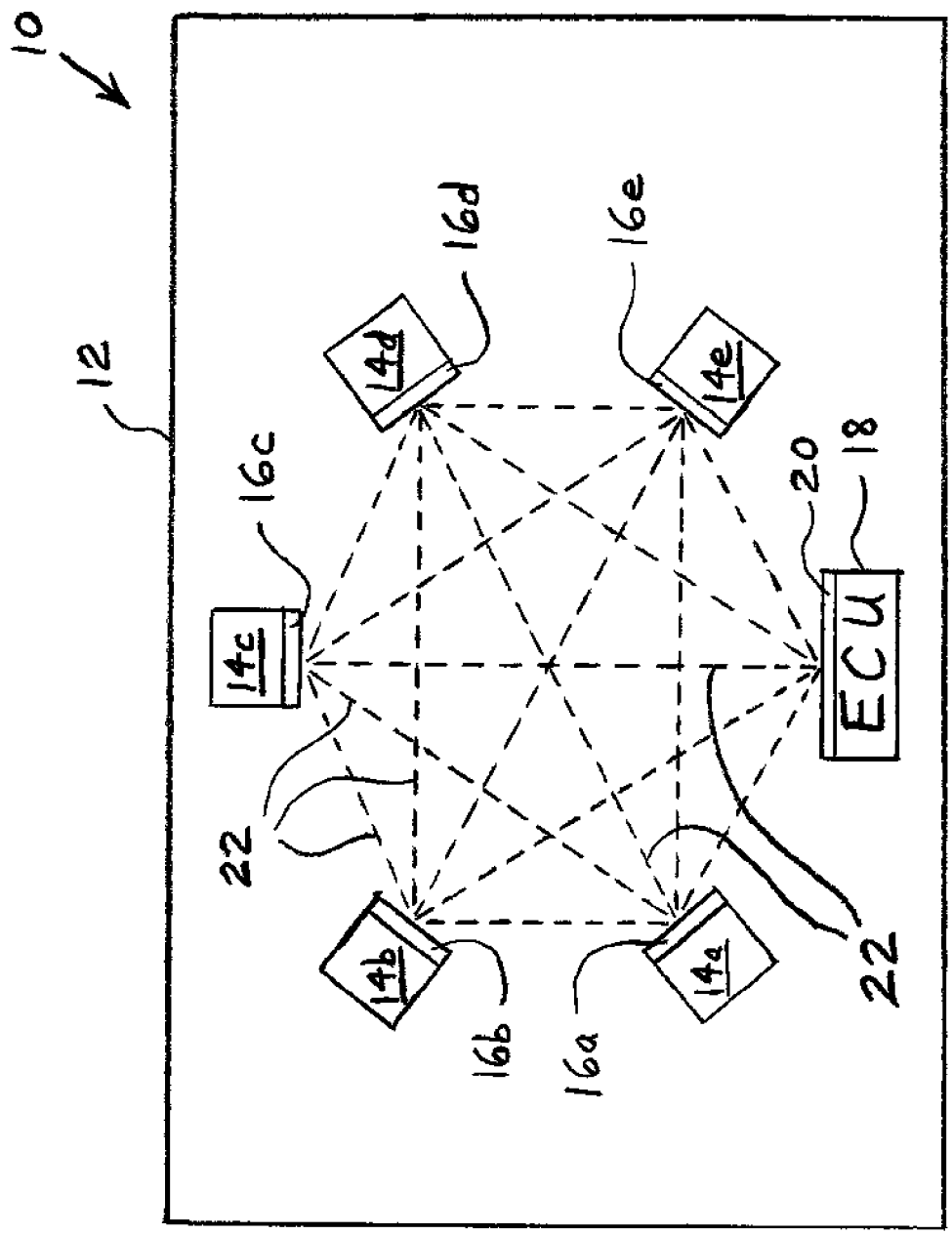
FIG. 1 is a schematic side view of one embodiment of a wireless network arrangement of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

The embodiments hereinafter disclosed are not intended to be exhaustive or limit the invention to the precise forms disclosed in the following description. Rather the embodiments are chosen and described so that others skilled in the art may utilize its teachings.

Referring now to the drawings and particularly to FIG. 1, there is shown one embodiment of a wireless network arrangement 10 of the present invention. Network arrangement 10 includes a schematically-illustrated enclosure 12. Although enclosure 12 is shown to be rectangular in FIG. 1, enclosure 12 may be of any shape. For example, enclosure 12 may be in the form of a building, a particular room or set of rooms within a building, or a vehicle, such as an automobile, boat or airplane.

Within enclosure 12 are disposed wireless electronic communication devices, or "nodes" as referred to herein, having reference numbers 14*a-e*. Any of nodes 14*a-e* may be a discrete electronic device, such as a sensor or actuator, for example. Any of nodes 14*a-e* may also be an isolated wired network or wired subnetwork, such as a controller area network (CAN). In one specific embodiment, node 14*a* is in the form of an isolated actuator or sensor, such as an automobile tire pressure sensor; and nodes 14*b-e* are in the form of isolated networks or subnetworks such as a Powertrain CAN, a Climate Control CAN, a Body CAN, and a Comfort CAN, respectively. Thus, arrangement 10 may include a mix of discrete electronic devices and isolated wired networks or subnetworks. In addition to having wireless transmitters and/or receivers (not shown), nodes 14*a-e* may include respective microcontrollers 16*a-e* that function as gateways for protocol translation between the wired and wireless domains.

Arrangement 10 may also include a central electronic control unit (ECU) 18 having a radio interface in the form of a microcontroller 20 that functions as a gateway for protocol translation between ECU 18 and the wireless domain. ECU 18 may function as a central controller for each of nodes 14*a-e*.

Nodes 14*a-e* and ECU 18 may be wirelessly and communicatively coupled to each other, as indicated by the various wireless links 22 that are schematically illustrated in FIG. 1 with dashed lines. Specifically, each of nodes 14*a-e* and ECU 18 may be capable of engaging in two-way wireless communication with every other one of nodes 14*a-e* and ECU 18. In a particular embodiment, nodes 14*a-e* and ECU 18 communicate in the radio frequency spectrum. However, it is also possible within the scope of the invention for nodes 14a-e and ECU 18 to communicate via any other wireless means, such as sounds, optics, microwaves and/or infra-red signals, for example.

Ones of nodes 14a-e that are in the form of sensors may produce information to be included in the content of the wireless communications between nodes 14a-e and ECU 18. Ones of nodes 14a-e that are in the form of actuators may use or act upon information carried in the received communication signals.

The wireless architecture of the present invention may enable many different isolated wired structures to exist in the car. These isolated structures may then be networked together wirelessly as shown in FIG. 1. A single central ECU 18 with a radio interface can communicate with any isolated network, and any pair or group of isolated networks can also communicate mutually with each other over wireless links 22. This structure may allow enhanced flexibility in the topology of the network.

Each of wireless nodes 14a-e may perform radio transmission and reception and may have a small, respective microcontroller 16a-e which functions as a gateway for protocol translation between the wired and wireless domains, for example, wireless protocol-to-CAN and vice versa, wireless-protocol-to-LIN and vice versa, etc. Nodes 14a-e and ECU 18 may be networked together wirelessly such that members of any subgroup of these components can wirelessly communicate with each other.

Another embodiment of a wireless network arrangement 110 (FIG. 2) of the present invention includes an enclosure 112 in the form of an automobile having a steering wheel 114 with a user interface 116. Interface 116 includes a plurality of pushbuttons 118 which may be used to control various functions within automobile 112, e.g., radio control, telephone control, lighting, heating, direct-shift gear change, etc. An advantage of having pushbuttons 118 on steering wheel 114 is that a driver can perform numerous functions related to driving, comfort and convenience without taking his/her hands away from steering wheel 114, thereby reducing driving distraction. The number of pushbuttons provided on a steering wheel may be approximately between four and twelve, depending upon the functionalities to be provided to the driver in order to reduce distraction.

As may be evident, a very wide variety of functionalities may be provided through steering wheel interface 116 and pushbuttons 118. Further, different drivers may have widely varying preferences regarding the functionalities that they would like to use frequently. To accommodate such diversity, it is advantageous to have a suitable wireless communication architecture in place. Some possible examples of the control functionalities provided by interface 116 are the horn/signaling, cruise control, telephone calling, lighting control, steering wheel heating, direct-shift gear control, sunroof/moonroof opening and closing, power window control (for all windows), power locks (for all doors), indicator control (both sides of the vehicle), climate control (various functions), seat adjustment (e.g., massage/heating on/off), and radio function keys (various functions).

In flexible interior environments, where wiring requirements are not a constraint, various new features may be provided by steering wheel interface 116, such as querying the air pressure in all tires; querying the ambient temperature/pressure/humidity, etc.; and control of the windshield wipers.

The above-described examples illustrate the various functionalities that may be provided by using steering wheel pushbuttons 118. According to the present invention, a reconfigurable interface can be provided for the steering wheel pushbuttons. The reconfigurable interface may provide diversity and flexibility of functionality for both the manufacturer and the user. The present invention may provide an architecture for a wireless network that can provide the basis for a very flexible configuration of vehicle interiors, as exemplified by the embodiment of steering wheel pushbutton interface 116.

Each of steering wheel pushbuttons 118 may be programmed to perform any of a variety of different functions. The user may enter a setup mode by pressing a specific sequence of pushbuttons on steering wheel pushbutton interface 116. Pushbuttons 118 may be wirelessly coupled to a central controller 120 associated with interface 116, as indicated by dashed lines 122. Controller 120 may receive and process signals that result from the pressing of pushbuttons 118. The user may then navigate through a list of pre-configured options for setting the exact functionality of a pushbutton.

In the architecture of the present invention, no wiring may be required from steering wheel 114. A signal specifying the selected functionality may then be transmitted from controller 120 directly to one or more of the relevant isolated network(s)/sub-network(s). The signal may include a message-type identifier which identifies which of the networks/sub-networks the signal is intended for and/or which of the pushbuttons the signal is associated with.

The mappings between pushbuttons 118 and the configured functions may be displayed on a display 124 in a manner that is easily comprehended by the user. Thus, display 124 may provide feedback to a user during programming of pushbuttons 118 by the user. Display 124 may be in the form of an LCD display disposed in the instrument cluster, or may be in the form of a Heads-Up-Display (HUD), for example.

Display 124 may also provide feedback to a user during normal operation of pushbuttons 118. For example, if a pushbutton 118 is used to select a radio frequency, then display 124 may display the currently selected frequency. This may be especially advantageous in the case of a HUD because the driver may set and observe the currently selected frequency without ever having to either take his hands off of steering wheel 114 or takes his eyes off of the road.

As described above, electronic controller 120 is wirelessly communicatively coupled to electronic pushbuttons 118. Pushbuttons 118 may include suitable gateways, or a common gateway for all pushbuttons 118, for protocol translation. Controller 120 may receive a plurality of signals from pushbuttons 118. The signals may result from manual actuation of pushbuttons 118 in a coded sequence. That is, the user may set up the desired operations of pushbuttons 118 by entering keystrokes in a specific sequence according to a predetermined code that may have been loaded into controller 120 at the factory. Controller 120 may program the functions of pushbuttons 118 based on the signals received from pushbuttons 118.

Before the user programs the steering wheel pushbuttons in the setup mode, the steering wheel pushbuttons may be provided with a default set of functions. Multiple users may set up their own respective set of personalized functions for a same set of pushbuttons 118. In one embodiment, a user may access his set of custom pushbutton functions, and change the currently active set of pushbutton functions, by entering a code into steering wheel pushbutton interface 116.

Figure 3:
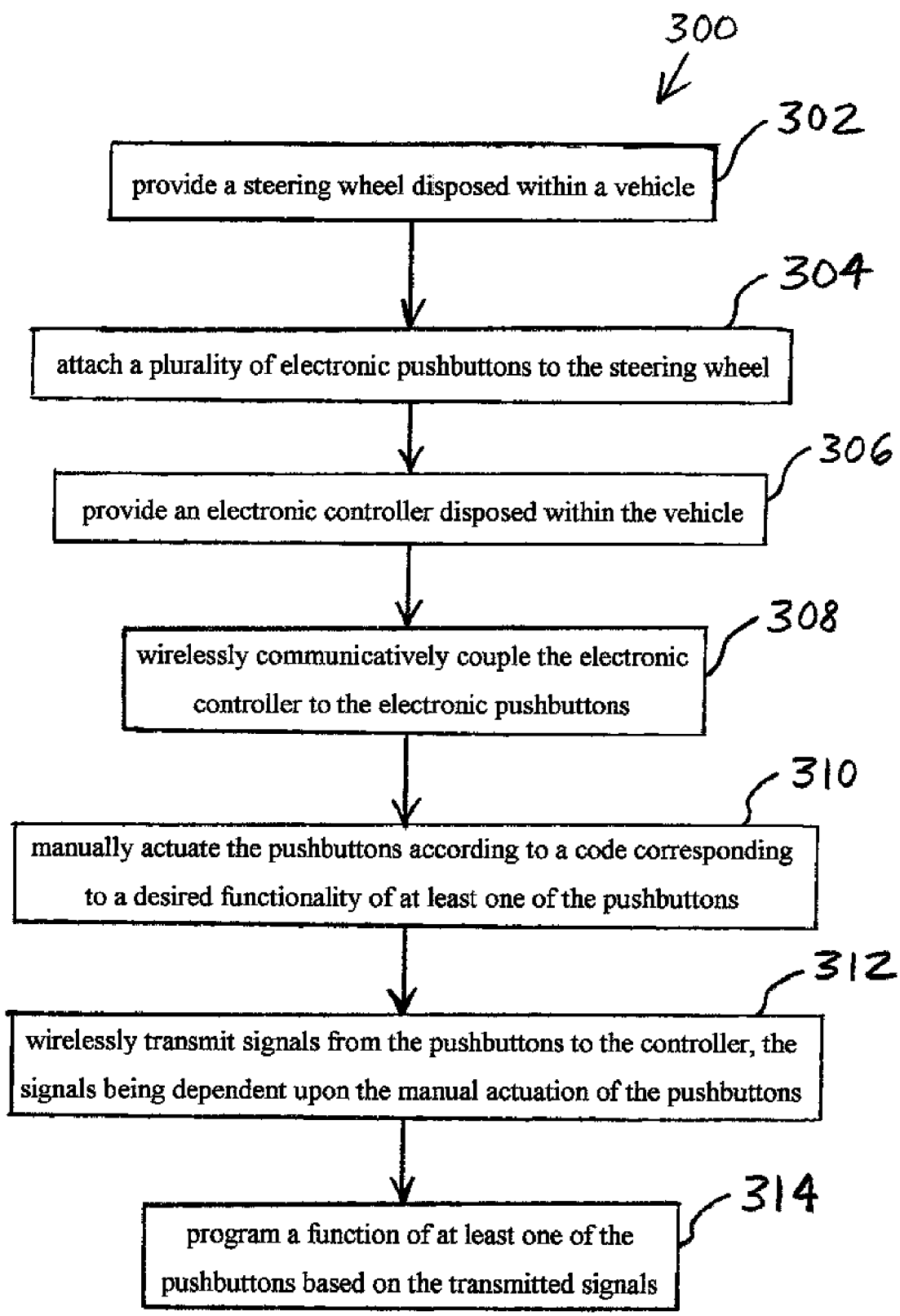
FIG. 3 is a flow chart illustrating one embodiment of an automotive networking method of the present invention.

One embodiment of an automotive networking method 300 of the present invention is illustrated in FIG. 3. In a first step 302, a steering wheel disposed within a vehicle is provided. For example, a steering wheel 114 may be disposed within a vehicle 112.

In a next step 304, a plurality of electronic pushbuttons are attached to the steering wheel. That is, pushbuttons 118 may be attached to steering wheel 114.

An electronic controller is disposed within the vehicle in step 306. For instance, electronic controller 120 may be disposed within vehicle 112.

Figure 2:
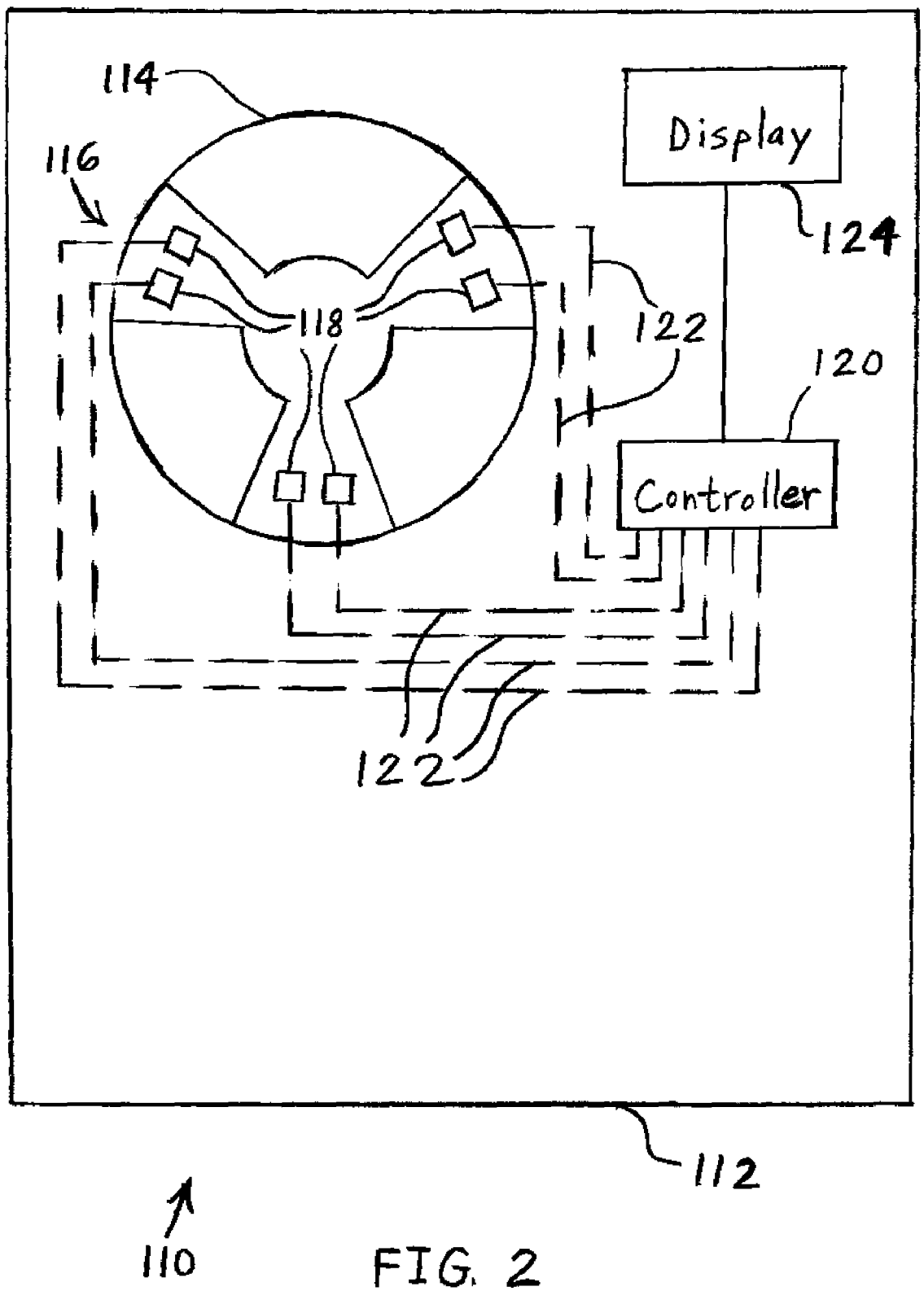
FIG. 2 is a schematic top view of one embodiment of a wireless automotive network arrangement of the present invention.

Next, in step 308, the electronic controller is wirelessly communicatively coupled to the electronic pushbuttons. In the embodiment of FIG. 2, controller 120 is wirelessly communicatively coupled to electronic pushbuttons 118.

In a next step 310, the pushbuttons may be manually actuated according to a code corresponding to a desired functionality of at least one of the pushbuttons. That is, a user may depress a predetermined sequence of pushbuttons 118 in order to assign a desired functionality to one or more of pushbuttons 118. Instructions provided by the manufacturer may specify the particular sequence of pushbuttons to be depressed in order to assign a certain functionality to a pushbutton. Different sequences of pushbuttons may be depressed in order to assign different functionalities to each of the pushbuttons.

Next, in step 312, signals are wirelessly transmitted from the pushbuttons to the controller, the signals being dependent upon the manual actuation of the pushbuttons. For example, pushbuttons 118 may have radio frequency transmitters that wirelessly transmit signals to controller 120, wherein the signals identify and correspond to the sequence of pushbuttons depressed by the user.

In a final step 314, a function of at least one of the pushbuttons is programmed based on the transmitted signals. That is, responsive to receiving the signals from pushbuttons 118, controller 120 may store in its memory a function to implement in response to future actuations of the pushbutton that has been programmed. Examples of pushbutton functions programmed by controller 120 may include radio functions such as AM/FM, Volume up/down, and HVAC functions such as temperature up/down and fan up/down.

Figure 4:
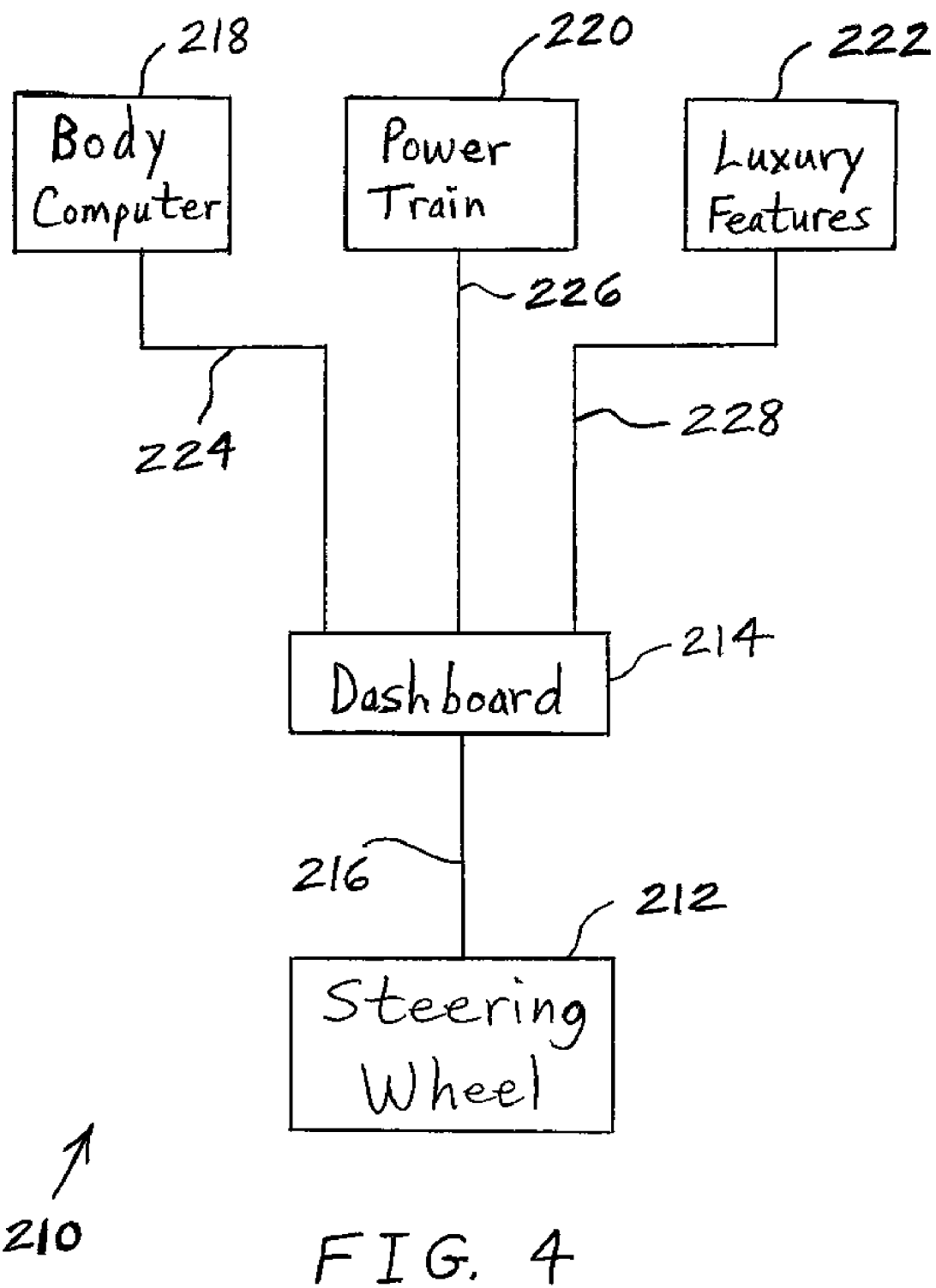
FIG. 4 is a block diagram of another embodiment of a wireless architecture of the present invention.

Another embodiment of a wireless architecture 210 of the present invention is illustrated in FIG. 4. Architecture 210 includes steering wheel electronics 212 in communication with dashboard electronics 214 via a link 216 that may be in the form of a local interconnect network (LIN), CAN or Recommended Communication Standard (RS232) specified by Electronic Industries Association (EIA), for example. Dashboard electronics 214 may be in communication with a body computer 218, power train 220 and luxury features 222 via respective links 224, 226, 228, each of which may be in the form of a CAN.

The present invention may provide a novel method and architecture for networking in a car by using wireless links to obtain a highly connected network. The architecture of the invention may provide connections between devices that are unconnected in the prior art and thus make possible the inclusion of new features for safety, comfort and/or convenience in the car. The specific embodiment of a pushbutton interface on a steering wheel that can be reconfigured to perform various user-desired functions is only one possible implementation of the novel architecture of the invention.

The present invention has been described herein as being applied to a wireless network that is set up inside the cabin of a vehicle. However, it is to be understood that the same principles of using wireless nodes for providing configurable components on or within moving or inaccessible parts can be applied in other areas of the car. Further, the present invention may be applied to non-automotive environments in which the use of wireless nodes would be advantageous, such as when the nodes are provided in moving parts, and/or where there is a need for the functions of the wireless nodes to be reconfigurable.

The use of the present invention is not limited to enclosures. For example, the present invention may be applied to outdoor spaces, e.g., a patio, porch or deck, where there exists a need for nodes to communicate without being connected together by wires.

While this invention has been described as having an exemplary design, the present invention may be further modified within the spirit and scope of this disclosure. This application is therefore intended to cover any variations, uses, or adaptations of the invention using its general principles.

What is claimed is:

1. A wireless network arrangement for a vehicle, comprising:
   an electronic controller disposed within the vehicle; and
   a plurality of wireless electronic components disposed within the vehicle and wirelessly communicatively coupled to the electronic controller, the components being networked together wirelessly such that members of any subgroup of the components can directly, bi-directionally and wirelessly communicate with each other.

2. The arrangement of claim 1 wherein each of the components includes a respective microcontroller configured to function as a wireless gateway.

3. The arrangement of claim 1 wherein the electronic controller includes a microcontroller configured to function as a wireless gateway.

4. The arrangement of claim 1 further comprising at least one movable part of the vehicle, at least one of the electronic components being attached to the at least one movable part.

5. The arrangement of claim 4 wherein the movable part comprises a steering wheel, the wireless electronic components including at least one pushbutton attached to the steering wheel.

6. The arrangement of claim 5, further comprising a display connected to the controller, the display being configured to provide feedback to a user during programming of the at least one pushbutton by the user.

7. The arrangement of claim 6 wherein the at least one pushbutton comprises a plurality of pushbuttons, the display being configured to display mappings between the pushbuttons and the programmed functions of the pushbuttons.

8. A network arrangement for a vehicle, the arrangement comprising:
   a steering wheel disposed within the vehicle;
   a plurality of electronic pushbuttons attached to the steering wheel; and
   an electronic controller disposed within the vehicle and wirelessly communicatively coupled to the electronic pushbuttons, the controller being configured to:
      receive a plurality of signals from the pushbuttons, the signals resulting from manual actuation of the pushbuttons in a coded sequence; and
      program a function of at least one of the pushbuttons based on the received signals.

9. The arrangement of claim 8 wherein each of the pushbuttons includes a respective gateway.

10. The arrangement of claim 9 wherein the gateway is configured to translate protocol between wired and wireless domains.

11. The arrangement of claim 8 wherein the electronic controller includes a microcontroller configured to function as a wireless gateway.

12. The arrangement of claim 8, further comprising a display connected to the controller, the display being configured to provide feedback to a user during programming of the pushbuttons.

13. The arrangement of claim 12 wherein the display is configured to display mappings between the pushbuttons and the programmed functions of the pushbuttons.

14. An automotive networking method, comprising:
providing a steering wheel disposed within a vehicle;
attaching a plurality of electronic pushbuttons to the steering wheel;
providing an electronic controller disposed within the vehicle;
wirelessly communicatively coupling the electronic controller to the electronic pushbuttons;
manually actuating the pushbuttons according to a code corresponding to a desired functionality of at least one of the pushbuttons;
wirelessly transmitting signals from the pushbuttons to the controller, the signals being dependent upon the manual actuation of the pushbuttons; and
programming a function of at least one of the pushbuttons based on the transmitted signals.

15. The method of claim 14 wherein each of the pushbuttons includes a respective microcontroller configured to function as a wireless gateway, the method comprising the further step of using the microcontrollers to translate protocol between wired and wireless domains.

16. The method of claim 15 wherein the microcontrollers are used to translate one of wireless protocol-to-Controller Area Network and wireless protocol-to-Local Interconnect Network.

17. The method of claim 14 wherein the electronic controller includes a microcontroller configured to function as a wireless gateway, the method comprising the further step of using the microcontroller to translate protocol between wired and wireless domains.

18. The method of claim 14, comprising the further steps of:
connecting a display to the controller; and
using the display to provide feedback to a user during the step of manually actuating the pushbuttons.

19. The method of claim 18, comprising the further step of using the display to display mappings between the pushbuttons and the programmed functions of the pushbuttons.

20. The method of claim 18, wherein the display is a Heads Up Display, the method comprising the further step of providing feedback to a user during normal operation of the pushbuttons.

* * * * *